United States Patent [19]

Schneider

[11] Patent Number: 5,735,488
[45] Date of Patent: Apr. 7, 1998

[54] METHOD AND APPARATUS FOR COUPLING SPACE VEHICLES

[75] Inventor: William C. Schneider, Houston, Tex.

[73] Assignee: The United States of America as represented by the Administrator of the National Aeronautics and Space Administration, Washington, D.C.

[21] Appl. No.: 654,460

[22] Filed: May 28, 1996

[51] Int. Cl.$^6$ .................. B64G 1/64; B64G 4/00
[52] U.S. Cl. ............... 244/161; 244/158 R; 294/98.1
[58] Field of Search ............... 244/158 R, 161; 294/98.1

[56] References Cited

U.S. PATENT DOCUMENTS

| | | | |
|---|---|---|---|
| 2,927,609 | 3/1960 | Vander Lans . | |
| 3,233,315 | 2/1966 | Levake | 294/98.1 X |
| 3,254,863 | 6/1966 | Tyler | 244/161 |
| 3,347,587 | 10/1967 | Frost | 294/98.1 X |
| 3,389,877 | 6/1968 | Huber et al. | 244/161 |
| 3,508,723 | 4/1970 | Warren et al. | 244/161 |
| 4,018,409 | 4/1977 | Burch et al. | 244/161 |
| 4,177,964 | 12/1979 | Hujsak et al. | 244/161 |
| 4,195,804 | 4/1980 | Hujsak et al. | 244/161 |
| 4,273,505 | 6/1981 | Clark et al. | 294/98.1 X |
| 4,391,423 | 7/1983 | Pruett et al. | 244/161 |
| 4,588,150 | 5/1986 | Bock et al. | 244/161 |
| 4,664,344 | 5/1987 | Harwell et al. | 244/161 |

FOREIGN PATENT DOCUMENTS

| | | |
|---|---|---|
| 0226497 | 9/1989 | Japan . |
| 2-28492 | 1/1990 | Japan .................. 294/98.1 |
| 379468 | 4/1973 | U.S.S.R. ............... 294/98.1 |

*Primary Examiner*—William Grant
*Attorney, Agent, or Firm*—Hardie R. Barr

[57] ABSTRACT

A first space vehicle is attached with a second space vehicle which includes a rocket propulsion nozzle having a combustion chamber upstream from the nozzle throat. Apparatus 10 includes an elongate grappling arm 12 extending from the first space vehicle, a pair of inflatable bladders 16, 18 positioned about the grappling arm for engaging an inner surface of the combustion chamber upon inflation, and a pair of rear bladders 20, 22 positioned about the grappling arm for engaging an inner surface of the nozzle downstream from the combustion chamber upon inflation for aligning the grappling arm and the rocket propulsion nozzle. A pressurized fluid source 24 is provided on the first space vehicle for supplying fluid pressure to the inflatable bladders, and a fluid control valve manifold 30 selectively controls the release of pressurized fluid to the bladders. According to the method of the invention, the grappling arm is inserted into the rocket propulsion nozzle, and the control valves are actuated to first inflate the front bladders and thereby interconnect the grappling arm and the rocket propulsion nozzle. The rear bladders are subsequently inflated to align a central axis of the grappling arm with a central axis of the rocket propulsion nozzle. Inflation of the rear bladders provides an axial reaction load to balance the axial load provided by the front bladders. Attaching the vehicles in space may be controlled from the earth by activating the control valves to inflate the bladders. The cost of attaching space vehicles is significantly reduced by attaching a grappling arm on one vehicle with the existing rocket propulsion nozzle of another vehicle.

21 Claims, 1 Drawing Sheet

METHOD AND APPARATUS FOR COUPLING SPACE VEHICLES

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

The present invention relates to methods and apparatus for attaching or coupling space vehicles. More particularly, this invention relates to techniques for attaching a grapple arm on one space vehicle to the rocket propulsion nozzle of another space vehicle.

BACKGROUND OF THE INVENTION

The ability to rendezvous and dock space vehicles is essential to space operations and exploration. The docking and interconnection of vehicles in space is a task of specific difficulty which typically requires specially constructed coupling elements on each vehicle. These coupling structures typically take the form of compatible male and female devices, such as a conical seating platform on one vehicle and a docking adapter on another vehicle for engagement with the conical seating structure during alignment and coupling of the spacecraft. The spacecraft coupling and docking structures typically absorb the relative kinetic energy between the two space vehicles upon engagement, and after coupling rigidly and securely interconnect the two spacecraft until their desired disengagement or decoupling.

U.S. Pat. No. 3,508,723 discloses a technique for connecting two space vehicles by inserting a probe on one space vehicle into the rocket engine nozzle of the other space vehicle. Once the probe has been properly inserted, shoes on the probe are expanded by gas or hydraulic pressure to lock onto the throat of the nozzle, thereby securing the space vehicles together. A plurality of pivot dogs engage the rocket engine nozzle upstream from the throat, while a support ring engages the nozzle downstream from the throat. The mechanical interconnection of the spacecraft through the pivot dogs and support ring exerts a high local stress on the nozzle, which may damage the nozzle.

Spacecraft attaching structures may take various forms, and accordingly the attaching structure on one space vehicle typically must be specifically designed for mating with the attaching structure on another space vehicle for the vehicles to be coupled. It is thus not generally possible to secure one space vehicle to another space vehicle unless each vehicle has previously been provided with a compatible attaching structure. Accordingly, these attaching structures are relatively expensive because each structure is specially adapted for a specific application. Also, prior art attaching structures on space vehicles typically are heavy and expensive.

Techniques for coupling spacecrafts desirably are able to interconnect relatively approaching spacecraft even when the vehicles are not properly aligned. The ease with which aligned spacecraft can be properly attached is a significant factor which affects the reliability and utilization of specific attachment techniques. In most applications, attachment is accomplished by remotely controlling one spacecraft on earth, and typically the controlled vehicle includes an elongate probe or grappling arm for insertion into the conical seating platform in the other vehicle. U.S. Pat. Nos. 4,177, 964, 4,195,804, 4,391,423, and 4,588,150, and Japanese Patent No. 226,497 illustrate attaching structures for remotely coupling space vehicles.

In addition to being expensive and not easily adaptable for coupling different types of space vehicles, prior art attachment structures on each vehicle are complex, which inherently increases the risk that one of the attachment components may not properly function. The space vehicle typically must have a shape or design to accommodate the attachment structure, and to transit the load from the attachment structure to the primary frame structure of the space vehicle.

U.S. Pat. No. 2,927,609 discloses a technique for plugging pipes which includes an annular bladder attached to a handle.. U.S. Pat. No. 3,389,877 discloses an inflatable tether device for tethering objects in a zero gravity environment. The device includes an inflatable ring for securing the tether to a spacecraft. Neither of these patents discloses a structure for securely attaching one space vehicle to another space vehicle. U.S. Pat. No. 3,254,863 discloses a mechanism for interconnecting space vehicles. The disclosed structure assumes that space vehicles have been successfully attached so that conical tubes are aligned for mating engagement. After attachment is accomplished, a bladder is inflated to seal with an annular seat structure, thereby allowing astronauts to travel from one vehicle to another vehicle.

The disadvantages of the prior art are overcome by the present invention, and an improved method and apparatus are hereinafter disclosed for easily and inexpensively attaching space vehicles.

SUMMARY OF THE INVENTION

A typical rocket propulsion nozzle, as shown in FIG. 2 and FIG. 3, has certain inherent geometric characteristics or features which may be described generally as follows: a combustion chamber with an interior diameter which (proceeding from left to right, or in the direction of gas flow) decreases (negative slope) to a minimum at the nozzle throat; and an area of the nozzle downstream of the nozzle throat whose interior diameter progressively increases (positive slope) proceeding downstream of the nozzle throat.

A space vehicle attachment system employs an elongate grappling arm or stinger arm which extends from one space vehicle for insertion into the rocket propulsion nozzle of another space vehicle. A soft bumper is provided on the end of the grappling arm for preventing damage to the nozzle during attaching. Redundant toroid bladders are positioned along the grappling arm for inflation to engage the walls of the nozzle combustion chamber upstream from the nozzle throat. Another pair of toroidal bladders positioned along the grappling arm engage the wall of the nozzle downstream of the nozzle throat, preferably near the discharge end of the rocket nozzle. Pressurized fluid for inflating the bladders is provided from fluid cartridges. Flow regulators control the discharge of pressurized fluid from the cartridges to the bladders.

It is the unique geometry of the rocket propulsion nozzle, negative slope upstream of the throat and positive slope downstream of the throat, that makes the inflatable toroid bladder capture system effective for capturing and securing a spacecraft by grappling its nozzle. With one set of inflatable bladders (fixed to the shaft) positioned inside the throat, on the negative slope nozzle region, and the other set (also fixed to the same shaft) positioned outside the throat, on the positive slope region, each bladder set applies, upon inflation, a circumferential uniform radial pressure, and an axial force that is equal and opposite to that applied by the other bladder set. That is, the set upstream exerts an axial force in the rearward direction and the set downstream exerts an equal and opposite (forward) axial force. The opposing forces capture and secure the nozzle.

According to the method of the invention, a first controlled space vehicle with a grappling arm extending therefrom may be positioned for attachment with a second space vehicle having one of various types of rocket propulsion nozzles. A front bumper positioned on the grappling arm protects the nozzle as the grappling arm is inserted into the nozzle. Once inserted, the pair of front toroidal bladders are inflated until the front bladders physically engage the wall of the combustion chamber upstream from the nozzle throat, thereby interconnecting the space vehicles, although the central axis of the grapple arm may not be aligned with the axis of the nozzle and the connection is not rigid. At this stage the vehicle having the nozzle is said to be "captured." Thereafter, the pair of rear toroidal bladders are inflated to engage the wall of the nozzle downstream from the throat. The vehicles are thereby securely attached to each other, with the bladders affixed to one vehicle gripping the nozzle throat of the other vehicle. By utilizing inflatable toroidals for structurally connecting the space vehicles, the axial component of the contact load exerted by the front bladder on the combustion chamber side of the nozzle throat is exactly balanced by the equal and opposite axial component of the contact load exerted on the downstream side of the nozzle throat by the rear bladder. The nozzle throat is thus, secured by the equal and oppositely directed axial components of the front and rear bladder contact load forces. Uniform pressure supplied by the bladders to the walls of the nozzle minimizes contact stress on the nozzle, and allows the grappling arm to be structurally connected or attached with the various types of rocket propulsion nozzles having different geometric proportions, but same general configuration.

It is an object of the present invention to provide an improved technique for attachment of space vehicles, wherein each space vehicle need not be provided with a respective male or female attachment structure. A related object of the invention is an improved grappling arm on one space vehicle which allows that vehicle to be attached to various types of other space vehicles.

Another object of the invention is a space vehicle attachment system which is relatively simple and highly reliable, and which does not require precise alignment of the vehicles prior to initiating attachment operations. The system of the present invention may be remotely controlled. Proper alignment of the space vehicle is achieved during the attachment operation.

Yet another feature of the invention is that the grappling arm on one space vehicle is adapted for interconnecting that vehicle to a rocket propulsion nozzle of another space vehicle without damaging the nozzle or imparting highly concentrated forces which may lead to failure of the rocket propulsion system.

A significant advantage of the invention is that each space vehicle need not be designed or configured with special structural surfaces which accommodate an attachment structure. By utilizing the rocket propulsion nozzle of a space vehicle for attachment, structural integrity for attachment with that space vehicle is inherently provided.

It is also an advantage of this invention that the attachment system is relatively inexpensive and highly reliable. The system has few moving parts, and may be easily adapted for redundancy.

Another significant advantage of the invention is that the same grappling arm on one space vehicle may be used for attachment with various types of other space vehicles. The high cost of designing and manufacturing an attachment system uniquely tailored to each type of space vehicle is thus obviated.

These and further objects, features, and advantages of the present invention will become apparent from the following description, wherein reference is made to the figures in the accompanying drawings.

DETAILED DESCRIPTION OF PREFERRED EMBODIMENTS

Figure 1:
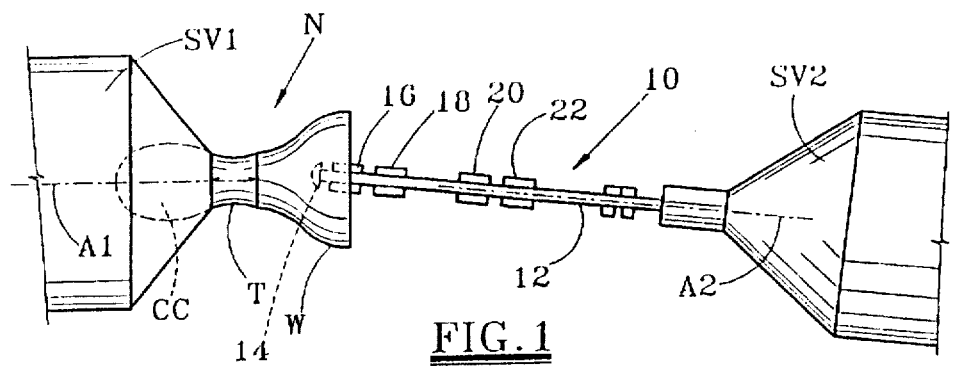
FIG. 1 is a pictorial view of the rearward end of one space vehicle with an engine propulsion nozzle generally aligned for attachment with the front end of another space vehicle having an elongate grappling arm extending therefrom.

FIG. 1 depicts the rearward end of one space vehicle SV1 and the front end of another space vehicle SV2. SV1 may be any type of space vehicle, including a satellite, having a conventional rocket propulsion nozzle N thereon which is structurally connected or attached with the frame of the space vehicle. The rocket propulsion nozzle N includes a combustion chamber CC upstream from the nozzle throat T, and a nozzle wall W downstream from the throat T. It should be understood that SV2 may be attached to SV1 according to the present invention even though SV1 is an existing space vehicle with no specially designed structure thereon. The attachment apparatus 10 attached to SV2 thus attaches to the conventional propulsion nozzle N of SV1, thereby attaching and structurally connecting SV1 and SV2.

The controlled vehicle SV2 includes attachment apparatus 10 thereon secured to the structural frame of this vehicle. Apparatus 10 includes an elongate grappling arm 12, which comprises a hollow structural tube having a generally cylindrical configuration. The free or cantilevered end of the tube 12 includes a soft material bumper 14 for minimizing damage to the rocket propulsion nozzle N during attachment operations. When initiating attachment operations, the central axis A1 of SV1 and thus nozzle N will typically not be aligned with the central axis A2 of SV2 and thus grappling arm 12. The bumper 14 may be formed from a relatively soft material, such as rubber, to minimize damage to the nozzle N if the end of the grappling arm 12 inadvertently engages the nozzle during attachment.

Figure 2:
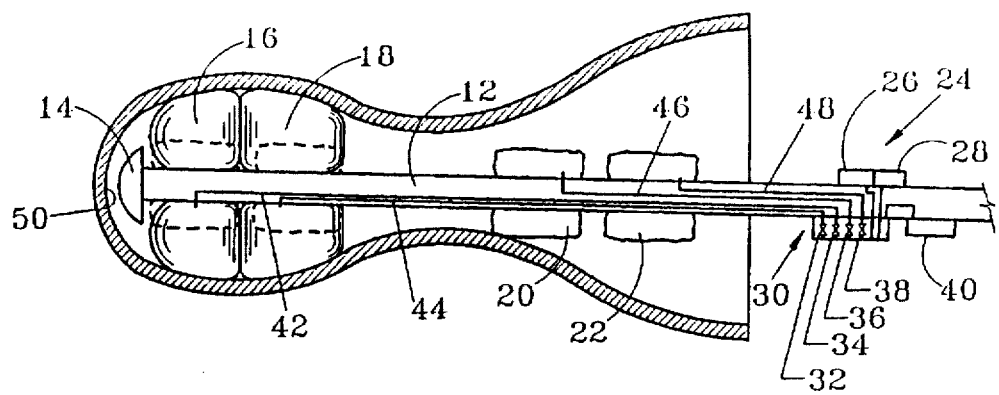
FIG. 2 is a pictorial view of a simplified engine propulsion nozzle as generally shown in FIG. 1 with the grappling arm inserted therein and the front bladders inflated for engagement with the walls of the combustion chamber.

As shown in FIGS. 1 and 2, the attachment apparatus 10 includes a first and second front bladders 16, 18 positioned along the front end of grappling arm 12. Each front bladder 16, 18 has a generally toroidal configuration such that each bladder is positioned radially about the arm 12. Also positioned along the arm 12 are first and second rear bladders 20, 22 each also having a generally toroidal configuration. As explained subsequently, the pair of front bladders and the pair of rear bladders are desired for redundancy, so that the attachment system of the present invention is fully functional even if one of the pair of front bladders and/or one of the pair of rear bladders should fail to inflate.

Also positioned along arm 12 is a pressurized fluid source 24. The source 24 may comprise a plurality of carbon dioxide cartridges 26, 28 each capable of releasing a relatively large volume of carbon dioxide to the bladders. Various other pressurized gasses may be used to inflate the bladders, such as nitrogen. The inflating fluid preferably is contained within a pressurized vessel, such as a cartridge, although the pressurized fluid could be generated in space by various techniques, such as reacting chemicals to produce the pressurizing gas.

Also positioned along arm 12 is a manifold 30 which may be a conventional valve manifold for controlling the release of pressurized fluid from source 24 to each of the bladders. Manifold 30 may have various configurations, and may include control valves 32, 34, 36 and 38 each for controlling fluid flow along a respective fluid line 42, 44, 46 and 48 to a respective bladder 16, 18, 20 and 22. Each control valve may be selectively opened and closed utilizing activation avionics package 40 also positioned along the arm 12. Each flow line 42, 44, 46 and 48 is preferably housed within the interior of the tube 12, and extends from the valve manifold 30 to the respective bladder. Each of the valves 32, 34, 36 and 38 may include a conventional pressure regulator therein, so that pressure to each of the bladders 16, 18, 20 and 22 is automatically limited to a preselected value. While the pressurized fluid source 24, the control valve manifold 30 and the activation electronics 40 may be positioned at various locations on SV2, it is a particular feature of the invention that each of these components is positioned along the arm 12, and preferably is positioned along the arm at a location spaced axially opposite the front bladders 16, 18 with respect to the rear bladders 20, 22.

Figure 3:
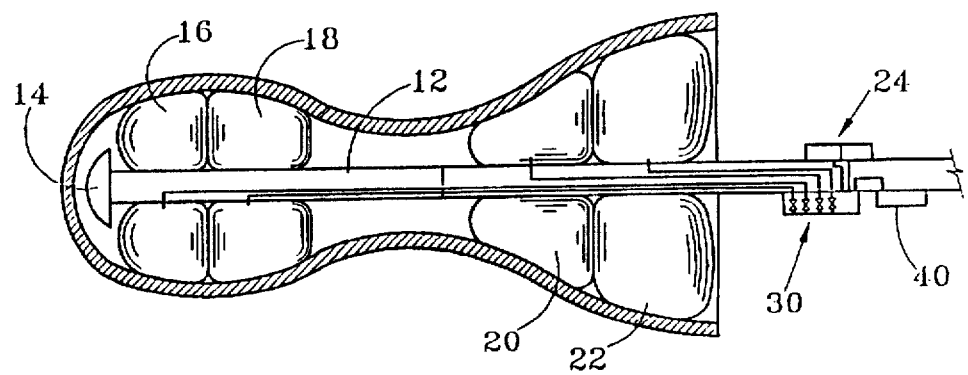
FIG. 3 illustrates the nozzle and grappling arm generally shown in FIG. 2, with both the front bladders and the rear bladders inflated for attachment of the space vehicles.

According to the method of the present invention, SV2 is maneuvered in a conventional manner from the position as generally shown in FIG. 1 to the position as shown in FIG. 2. SV2 is thus moved toward SV1 until at least a portion of the arm 12 is within the nozzle N of SV1, and more importantly until each of the front bladders 16, 18 is within the combustion chamber CC upstream from the throat T. At this stage, as shown in Mg. 2, the axis A1 of the nozzle N typically would not be aligned with the axis A2 of the arm 12. Nevertheless, activation of avionics package 40 may be controlled remotely to open each of the valves 32 and 34, thereby supplying pressurized gas from the source 24 to each of the bladders 16, 18 and thereby inflating each of the toroidal front bladders. FIG. 2 thus depicts the deflated position of each of the bladders 16, 18 in dashed lines, while the inflated position of each of the bladders 16, 18 is shown in solid lines. Once the bladders 16, 18 are inflated, SV1 has been "captured" since the inflated bladders cannot be retracted from the reduced diameter throat T. Once the inflated front bladders capture SV1 to SV2, the activation avionics package 40 may be actuated to open the valves 36 and 38, thereby inflating each of the rear bladders 20, 22. The inflation of the rear bladders 20, 22, as shown in FIG. 3, automatically centralizes the arm 12 with respect to the nozzle N, thereby aligning the nozzle N of vehicle SV1 with the axis of arm 12.

In addition to automatically centering and aligning the arm 12 with the nozzle N, the inflation of the rear bladders 20, 22 creates a reaction load which balances or offsets the reaction load created by the inflation of the front bladders 16, 18. When only the front bladders are inflated, as shown in FIG. 2, an axial reaction load between the inflated front bladders and the nozzle is created, its magnitude depending on the configuration of the combustion chamber CC and the position of the front bladder within the combustion chamber. This axial force typically will tend to move the front bumper 14 toward the front surface 50 of the nozzle N. By inflating the rear bladders 20, 22, an opposite axial force is created on the nozzle near the throat to balance or offset the axial force created on the nozzle near the throat by the inflation of the front bladders.

By forming each of the bladders 16, 18, 20 and 22 with a generally toroidal configuration, the inflation of each bladder creates a substantially uniform pressure about the circumference of the nozzle N. This substantially uniform circumferential loading of the nozzle minimizes damage to the nozzle since loading is uniformly distributed. Loading also is not concentrated at small areas, which would create high stresses in the nozzle. By utilizing toroidal bladders which uniformly load the nozzle, forces can reliably be applied from SV2 through the arm 12 to the nozzle N and thus the frame or structure of SV1, thereby allowing SV2 to manipulate SV1 without damaging the nozzle.

It is a particular feature of the present invention that redundant front bladders 16, 18 and redundant rear bladders 20, 22 are provided. In the event that, for some reason, one of the front bladders cannot be inflated, the other front bladder may still be inflated to capture the arm 12 within the nozzle 10. Similarly, if one of the rear bladders 20, 22 cannot be inflated, inflation of the other rear bladder will automatically center and align the axis of the arm 12 with the axis of the nozzle N, and will also balance the axial loading provided by inflation of the front bladders. Opposing axial forces exerted by the front and rear bladders on opposite sides (front and rear respectively) of the throat area of the propulsion nozzle N serve to securely attach the nozzle, and thus the space vehicle to which it is structurally connected, to the arm 12 and thus the other space vehicle. While redundant front bladders and redundant rear bladders are preferred, a single front bladder may be used with either a single or redundant rear bladder. Also, both one or more front bladders and one or more rear bladders are preferred, although the rear bladder(s) may be eliminated, if only capture and not secure attachment is desired. No mechanism for centering the axis of the arm 12 and the axis of the nozzle N may be necessary for some applications. In other cases, a mechanism other than a rear bladder may be used for centering the arm 12 with the nozzle N after capture.

To remove the structural connection between the space vehicles, each of the valves within the manifold 30 may be activated by the avionics package 40 so that pressure within each flow line 42, 44, 46 and 48 is vented. During venting, each control valve may remain closed for sealing pressurized fluid within the source 24. By venting the pressure within the bladder 16, 18, 20 and 22, the bladders tend to automatically deflate to a position such that rear bladders no longer engage the walls W of the nozzle N, and the front bladders may pass through the restrictive diameter throat T. Once the bladders have been deflated, SV2 may then be moved away from SV1 with the arm 12 being retracted from the nozzle N. If desired, the same space vehicle SV2 may be reattached to SV1 at a later date. Alteratively, SV2 may be attached to another space vehicle which has an existing rocket propulsion nozzle thereon. It is a particular feature of the invention that the attachment apparatus 10 on SV2 is capable of attachment with various types of space vehicles each with a slightly different rocket propulsion nozzle configuration, since the inflatable bladders easily conform to the configuration of the walls of the combustion chamber and the walls of the nozzle to accomplish the attachment purposes as described herein.

Various modifications to the present invention will be apparent from the above description of the preferred embodiments. While the invention has thus been described in detail for these embodiments, it should be understood that this explanation is for illustration, and that the invention is not limited to the disclosed embodiments. Modifications to the described structure and to the method of the present invention are thus contemplated and may be made without departing from the spirit of the invention, which is defined by the claims.

What is claimed is:

1. Apparatus for structurally connecting a first vehicle with a second vehicle in space, the second vehicle including a rocket propulsion nozzle having a combustion chamber upstream from a nozzle throat, the apparatus comprising:

an elongate grappling arm extending from the first vehicle;

an inflatable front bladder positioned adjacent a front end of the grappling arm for engaging, upon inflation, an inner surface of the combustion chamber upstream of the nozzle throat, exerting a first axial reaction load on said inner surface of the combustion chamber, and thereby capturing the rocket propulsion nozzle with the grappling arm;

an inflatable rear bladder positioned along the grappling arm for engaging, upon inflation, an inner surface of the rocket propulsion nozzle downstream from the nozzle throat exerting a second axial reaction load on said inner surface of the rocket propulsion nozzle downstream from the nozzle throat which balances said first axial reaction load, thereby attaching and aligning the grappling arm with the rocket propulsion nozzle; and means for inflating said front and rear bladders.

2. The apparatus as defined in claim 1, wherein said means for inflating comprises:

a pressurized fluid source on the first vehicle for supplying pressurized fluid to the front and rear bladders to inflate the front and rear bladders; and pressure control means for selectively controlling the release of pressurized fluid from the pressurized fluid source to the front and rear bladders.

3. The apparatus as defined in claim 2, wherein the inflatable front bladder comprises:

a first front bladder positioned along the grappling arm; and a second front bladder positioned along the grappling arm and spaced axially from the first front bladder.

4. The apparatus as defined in claim 3, further comprising:

means for fluidly interconnecting the pressurized fluid source with, respectively, the first front bladder and the second front bladder.

5. The apparatus as defined in claim 4, wherein the rear bladder comprises:

a first rear bladder positioned axially along the grappling arm; and a second rear bladder positioned axially along the grappling arm and spaced axially from the first rear bladder.

6. The apparatus as defined in claim 5, comprising:

means for fluidly interconnecting the pressurized fluid source with, respectively, the first rear bladder and the second rear bladder.

7. The apparatus as defined in claim 4, wherein, the grappling arm includes an elongate hollow structural tube extending axially from at least the pressurized fluid source to the first front bladder.

8. The apparatus as defined in claim 2, wherein each of the front bladder and the rear bladder has a generally toroidal configuration for supplying substantially uniform radial pressure to the rocket propulsion nozzle.

9. The apparatus as defined in claim 2, wherein each of the pressurized fluid source and the pressure control means are positioned along the grappling arm and are spaced axially opposite the rear bladder with respect to the front bladder.

10. The apparatus as defined in claim 1, wherein the elongate grappling arm further comprises:

a hollow structural tube extending axially from the first space vehicle to at least the front bladder; and an end bumper on a front end of the tube for minimizing damage to the rocket propulsion nozzle during attachment of the space vehicles.

11. Apparatus for structurally connecting a first space vehicle with a second space vehicle, the second space vehicle including a rocket propulsion nozzle having a combustion chamber upstream from a nozzle throat, the apparatus comprising:

an elongate hollow structural tube extending from the first space vehicle;

an inflatable front bladder having a toroidal configuration positioned about the hollow structural tube and adjacent a front end of the tube for engaging, upon inflation, an inner surface of the combustion chamber upstream of the nozzle throat, exerting a first axial reaction load on said inner surface of the combustion chamber, and thereby capturing the rocket propulsion nozzle with the grappling arm;

an inflatable rear bladder having a toroidal configuration positioned about the hollow structural tube for engaging upon inflation, the inner surface of the nozzle downstream from the combustion chamber, exerting on the inner surface of the rocket propulsion nozzle downstream from the nozzle throat a second axial reaction load which balances said first axial reaction load, and thereby attaching and aligning the grappling arm with the rocket propulsion nozzle;

a pressurized fluid source on the first space vehicle for supplying pressurized fluid to the front bladder and to the rear to inflate each of the front bladder and rear bladder; and a fluid control means for selectively controlling the release of pressurized fluid from the pressurized fluid source to each of the front bladder and the rear bladder.

12. The apparatus as defined in claim 11, further comprising:

an end bumper on a front end of the hollow structural tube for minimizing damage to the rocket propulsion nozzle during attachment of the space vehicles.

13. The apparatus as defined in claim 11, wherein, the inflatable front bladder includes a first front bladder and a second front bladder axially spaced from the first front bladder; and the rear bladder includes a first rear bladder and a second rear bladder axially spaced from the first rear bladder.

14. The apparatus as defined in claim 13, further comprising:

means for fluidly interconnecting the fluid control means with, selectively, the first front bladder, the second front bladder, the first rear bladder, and the second rear bladder.

15. The apparatus as defined in claim 14, wherein, the means for fluidly interconnecting the fluid control means is housed within the elongate hollow structural tube; and the pressurized fluid source and the fluid control means are positioned axially opposite the first and second front bladders with respect to the first and second rear bladders.

16. A method of structurally connecting a first space vehicle with a second space vehicle, the second space vehicle including a rocket propulsion nozzle having a combustion chamber upstream from a nozzle throat, the method comprising:

providing an elongate grappling arm extending from the first space vehicle;

providing on the elongate grappling arm an inflatable front bladder adjacent a front end of the grappling arm;

providing on the elongate grappling arm an inflatable rear bladder spaced from the front bladder;

engaging by inflating the front bladder, an inner surface of the combustion chamber upstream from the nozzle throat and thereby exerting a first axial reaction load on the inner surface of the combustion chamber; and engaging by inflating the rear bladder, an inner surface of the nozzle downstream from the combustion chamber and thereby exerting on the inner surface of the rocket propulsion nozzle downstream from the nozzle throat a second axial reaction load which balances the first axial reaction load, thereby attaching the grappling arm and the first space vehicle to the rocket propulsion nozzle and the second space vehicle.

17. The method as defined in claim 16, wherein:

the step of providing an inflatable front bladder further comprises:
providing a first front bladder and a second front bladder, axially spaced on the grappling arm from the first front bladder, and the step of providing an inflatable rear bladder further comprises:

providing a first rear bladder and a second rear bladder, axially spaced on the grappling arm from the first rear bladder.

18. The method as defined in claim 17, further comprising:

configuring at least one of the first front and the second front bladder and at least one of the first rear and the second rear bladder in a generally toroidal configuration such that inflation of said at least one of the first front and second front bladder and said at least one of the first rear and second rear bladder applies a substantially uniform pressure to the rocket propulsion nozzle.

19. The method as defined in claim 18, further comprising:

providing pressurizing means to the first and second front bladders and the first and second rear bladders.

20. The method as defined in claim 19, further comprising:

supplying each of the first and second front bladders and each of the first and second rear bladders with fluid pressure through a separate flow line housed within the elongate grappling arm.

21. The method as defined in claim 16, wherein the step of engaging by inflating the front bladder and the step of engaging by inflating the rear bladder further comprise:

positioning a pressurized fluid source on the first space vehicle for supplying pressurized fluid to the inflatable front bladder and the inflatable rear bladder; and selectively controlling the release of pressurized fluid from the pressurized fluid source to each of the front bladder and the rear bladder.

* * * * *